United States Patent
Aycock et al.

(10) Patent No.: US 7,383,686 B2
(45) Date of Patent: Jun. 10, 2008

(54) SECONDARY FLOW, HIGH PRESSURE TURBINE MODULE COOLING AIR SYSTEM FOR RECUPERATED GAS TURBINE ENGINES

(75) Inventors: Larry W. Aycock, Chandler, AZ (US); John R. Barrett, Mesa, AZ (US); Howard M. Becker, Chandler, AZ (US); Michael J. Durden, Chandler, AZ (US); Robert A. Kime, Chandler, AZ (US); Brian D. Koch, Gilbert, AZ (US); Robert S. Sandoval, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 402 days.

(21) Appl. No.: 11/011,367

(22) Filed: Dec. 13, 2004

(65) Prior Publication Data

US 2006/0123796 A1 Jun. 15, 2006

(51) Int. Cl.
*F02C 6/08* (2006.01)
*F02C 7/10* (2006.01)
*F02C 7/12* (2006.01)

(52) U.S. Cl. ........................ 60/782; 60/39.511; 60/806
(58) Field of Classification Search .................. 60/782, 60/785, 266, 39.511, 806; 415/115
See application file for complete search history.

(56) References Cited

U.S. PATENT DOCUMENTS

| | | | |
|---|---|---|---|
| 2,680,001 A | | 6/1954 | Batt |
| 2,721,445 A | * | 10/1955 | Giliberty .................. 60/39.511 |
| 2,756,561 A | * | 7/1956 | Morley ..................... 60/39.511 |
| 2,826,895 A | * | 3/1958 | English ........................ 60/266 |
| 3,204,406 A | | 9/1965 | Howes et al. |
| 3,907,457 A | | 9/1975 | Nakamura et al. |
| 4,271,666 A | * | 6/1981 | Hurley et al. .................. 60/266 |
| 4,859,143 A | * | 8/1989 | Larrabee et al. ............ 415/142 |
| 4,979,872 A | * | 12/1990 | Myers et al. ................ 415/142 |
| 4,987,736 A | * | 1/1991 | Ciokajlo et al. .............. 60/797 |
| 5,165,847 A | | 11/1992 | Proctor et al. |
| 5,292,227 A | * | 3/1994 | Czachor et al. .......... 415/209.3 |
| 5,317,877 A | | 6/1994 | Stuart |
| 5,996,331 A | | 12/1999 | Palmer |
| 5,996,334 A | | 12/1999 | Richardson |
| 6,047,540 A | | 4/2000 | Dev |
| 6,358,001 B1 | * | 3/2002 | Bosel et al. ................. 415/142 |
| 7,124,572 B2 | * | 10/2006 | Aycock et al. ........... 60/39.511 |
| 2005/0235626 A1 | * | 10/2005 | Hull et al. ............... 60/39.511 |

* cited by examiner

*Primary Examiner*—Ted Kim
(74) *Attorney, Agent, or Firm*—Ingrassia Fisher & Lorenz

(57) ABSTRACT

A secondary flow, turbine cooling air system for the uniform cooling of high pressure turbine module components such as the turbine shroud, turbine blade tips, turbine nozzle, transion liner, and turbine bearing support housing in a recuperated gas turbine engine is provided. The secondary flow turbine cooling system provides uniform cooling air having a similar pressure and temperature in a recuperated gas turbine engine as the compressor discharge air of a non-recuperated gas turbine engine. A method for uniform cooling of high pressure turbine module components using the secondary flow turbine cooling air system is also provided.

14 Claims, 9 Drawing Sheets

SECONDARY FLOW, HIGH PRESSURE TURBINE MODULE COOLING AIR SYSTEM FOR RECUPERATED GAS TURBINE ENGINES

GOVERNMENT RIGHTS

This invention was made with Government support under DAAE07-02-3-0002 awarded by the US Army. The Government has certain rights in this invention.

BACKGROUND OF THE INVENTION

This invention relates generally to cooling systems for turbine modules and more specifically to high pressure cooling air systems for turbine modules in recuperated gas turbine engines.

The durability and performance of a gas turbine engine is directly related to the life and efficiency of the high pressure turbine (HPT) module components. Under normal operating conditions for gas turbine engines, the engine turbine components are exposed to extreme temperatures, which in time, have the potential to cause distress, reduce engine efficiency and reduce service life. If the engine is allowed to operate at these extreme temperatures the increased thermal expansion and contraction of these components adversely affects clearances and the relationship between components with different coefficients of thermal expansion. Consequently, these components must be cooled to avoid potentially damaging consequences at elevated operating temperatures. In a non-recuperated gas turbine engine, a portion of the compressed air from the main flow path is extracted at the output of the compressor, upstream of the combustion chamber, for cooling the HPT module components. When a recuperator is added to the thermodynamic cycle of the engine, the temperature of the compressor discharge air is elevated hundreds of degrees, as it passes through the recuperator. Therefore, the recuperator discharge air is too hot and does not have the capability to provide adequate cooling to meet the HPT module requirements.

A cooling system for a recuperated gas turbine engine is described in U.S. Pat. No. 3,907,457. In the '457 patent, a portion of compressed air from the main air stream is diverted around the combustion chamber to cool the bearing chamber. However, the air is diverted through the high temperature side of the engine, resulting in increased temperatures of the cooling air. This design therefore compromises the effectiveness of the cooling air.

An alternative cooling system for a gas turbine engine is described in U.S. Pat. No. 3,204,406. In the '406 patent, the cooling system delivers cooling air to the internal part of the engine from the compressors through conduits. In areas where high pressure is required, part of the conduit is routed externally through an intercooler to maintain the required temperature and pressure. This adds external plumbing which, in turn, adds weight while each external connection provides a potential leak path. The tortuous internal conduits described in the '406 patent are also susceptible to blockage and seal leakage.

As can be seen, there is a need for a cooling system for recuperated gas turbine engines that is efficient and straightforward in design.

SUMMARY OF THE INVENTION

In one aspect of the present invention there is provided a secondary flow turbine cooling air system for cooling recuperated turbine engine module components comprising: an outer flow path; a recuperator and turbine support adapter comprising at least one strut, the strut comprising an open passage running the length of the strut and wherein the recuperator and turbine support adapter is in fluid communication with the outer flow path through the strut; and an inner flow separator in fluid communication with the recuperator and turbine support adapter.

In another aspect of the present invention there is provided a secondary flow turbine cooling air system for cooling recuperated turbine engine module components comprising: an outer flow path for compressor discharge air; a recuperator and turbine support adapter comprising: an annular outer strutted body, the outer strutted body comprising a first outer ring and a first inner ring, the first outer ring connected to the first inner ring by a plurality of outer struts, and further comprising at least one outer open passage through the first inner ring, the outer open passage being positioned between two of the outer struts, an annular inner strutted body, the inner strutted body comprising a second outer ring and a second inner ring, the second outer ring connected to the second inner ring by a plurality of inner struts, at least one of the inner struts comprising an inner open passage running the length of the inner strut, wherein the inner open passage is aligned with the outer open passage, and wherein the recuperator and turbine support adapter is in fluid communication with the outer flow path through the inner strut, and a thermal spring connecting the first inner ring of the outer strutted body to the second outer ring of the inner strutted body; and an inner flow separator in fluid communication with the recuperator and turbine support adapter.

In a further aspect of the present invention there is provided a secondary flow turbine cooling air system for cooling recuperated turbine engine module components comprising: an outer flow path for compressor discharge air; a recuperator and turbine support adapter comprising: an annular outer strutted body, the outer strutted body comprising a first outer ring and a first inner ring, the first outer ring connected to the first inner ring by a plurality of outer struts, and at least one outer open passage through the first inner ring, the outer open passage being positioned between two of the outer struts, an annular inner strutted body, the inner strutted body comprising a second outer ring and a second inner ring, the second outer ring connected to the second inner ring by a plurality of inner struts, at least one of the inner struts comprising an inner open passage running the length of the inner strut wherein the inner open passage is aligned with the outer open passage, the inner open passage comprising a tube and a compliant duct, and wherein the recuperator and turbine support adapter is in fluid communication with the outer flow path through the inner strut, and a thermal spring connecting the first inner ring of the outer strutted body to the second outer ring of the inner strutted body; and an inner flow separator in fluid communication with the recuperator and turbine support adapter.

In yet another aspect of the present invention there is provided a secondary flow turbine cooling air system for cooling recuperated turbine engine module components comprising: an outer flow path for compressor discharge air; a recuperator and turbine support adapter comprising: an annular outer strutted body, the outer strutted body comprising a first outer ring and a first inner ring, the first outer ring connected to the first inner ring by a plurality of outer struts, and at least one outer open passage through the first inner ring, the outer open passage being positioned between two of the outer struts, an annular inner strutted body, the inner strutted body comprising a second outer ring and a second inner ring, the second outer ring connected to the second inner ring by a plurality of inner struts, at least one of the inner struts comprising an inner open passage running the length of the inner strut the inner open passage being aligned with the outer open passage, wherein the inner open passage is pressurized and wherein the recuperator and turbine support adapter is in fluid communication with the outer flow path through the inner strut, and a thermal spring connecting the first inner ring of the outer strutted body to the second outer ring of the inner strutted body; and an inner flow separator in fluid communication with the recuperator and turbine support adapter.

In a further aspect of the present invention there is provided a recuperated turbine engine comprising: a compressor; an outer flow path for passage of compressor discharge air discharged from the compressor; a recuperator and turbine support adapter comprising an annular outer strutted body, the outer strutted body comprising a first outer ring and a first inner ring, the first outer ring connected to first inner ring by a plurality of outer struts, and at least one outer open passage through the first inner ring, the outer open passage being positioned between two of the outer struts, an annular inner strutted body, the inner strutted body comprising a second outer ring and a second inner ring, the second outer ring connected to the second inner ring by a plurality of inner struts, at least one of the inner struts further comprising an inner open passage running the length of the inner strut wherein the inner open passage is aligned with the outer open passage, wherein the recuperator and turbine support adapter is in fluid communication with the outer flow path through the outer open passage to the inner open passage of the inner strut and a thermal spring connecting the first inner ring of the outer strutted body to the second outer ring of the inner strutted body; an inner flow separator in fluid communication with the recuperator and turbine support adapter; and turbine module components in fluid communication with the inner flow separator.

In yet another aspect of the present invention there is provided a method for cooling high pressure turbine module components of a recuperated turbine engine comprising the steps of: providing compressor discharge air by discharging cold compressed air from a compressor; providing a secondary flow cooling air by diverting a portion of the compressor discharge air through an open passage of a strut of a recuperator and turbine support adapter; flowing the secondary flow cooling air from the strut and along an inner flow separator; and cooling the high pressure turbine module components with the secondary flow cooling air.

The present invention also provides a method for uniform cooling of high pressure turbine module components of a recuperated turbine engine comprising the steps of: providing compressor discharge air by discharging cold compressed air from a compressor, wherein the compressor discharge air flows through an outer flow path to a recuperator and turbine support adapter, the recuperator and turbine support adaptor comprising an annular outer strutted body, the outer strutted body comprising a first outer ring and first inner ring, the first outer ring connected to the first inner ring by a plurality of outer struts, and further comprising at least one outer open passage through the first inner ring, the outer open passage being positioned between two of the outer struts and an open slot at an aft end of the first inner ring of the outer strutted body, an annular inner strutted body, the inner strutted body comprising a second outer ring and a second inner ring, the second outer ring connected to the second inner ring by a plurality of inner struts, at least one of the inner struts further comprising an inner open passage wherein the inner open passage is aligned with the outer open passage, and a thermal spring connecting the first inner ring of the outer strutted body to the second outer ring of the inner strutted body; providing a secondary flow cooling air by diverting a portion of the cold compressed air through the outer open passage and the open slot to the inner open passage of the inner strut of the recuperator and turbine support adapter; flowing the secondary flow cooling air from the inner open passage of the inner struts along an inner flow separator; and cooling the high pressure turbine module components with the secondary flow cooling air.

These and other features, aspects and advantages of the present invention will become better understood with reference to the following drawings, description and claims.

DETAILED DESCRIPTION OF THE INVENTION

Figure 1:
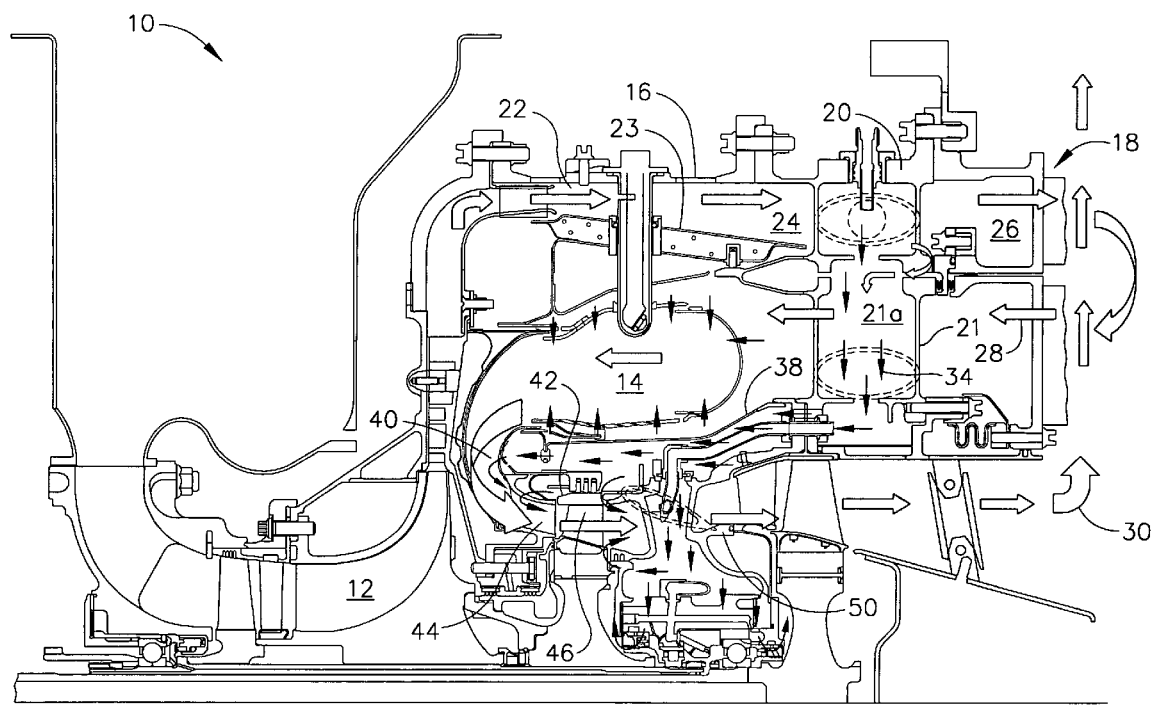
FIG. 1 shows an axial cross-sectional view through a portion of a gas turbine engine, according to the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, a secondary flow turbine cooling air system for the uniform cooling of turbine module components of a recuperated turbine engine is provided as well as methods for cooling the turbine module components. The secondary flow turbine cooling air system may comprise an outer flow path, and a recuperator and turbine support adapter. The recuperator and turbine support adapter may comprise a plurality of struts in fluid communication with the outer flow path and an inner flow separator. The outer flow path may be defined by a combustor casing of the turbine engine and an outer flow separator. As cold compressed air is discharged from a compressor (compressor discharge air), it may move along the outer flow path to the recuperator and turbine support adapter. At least one strut of the recuperator and turbine support adapter may comprise an open passage running the length of the strut, and a portion of the compressor discharge air may be diverted from the outer flow path through at least one open passage of the strut. As the compressed air exits the inner struts, it may be channeled along the inner flow separator to the turbine module components where the compressed air may provide cooling. Both the outer flow separator and the inner flow separator may also help to insulate the compressed air from radiant heat of a combustor. The applicability of the secondary flow turbine cooling air system is general in nature and may be utilized in recuperated engines with recuperator and turbine support adapters having struts.

The secondary flow turbine cooling air system of the present invention may allow for efficient uniform cooling of turbine module components. Turbine module components may include, but not limited to, turbine shrouds, turbine nozzles, turbine blade tips, transion liner, and turbine bearing support housing. Turbine module components may be subjected to extreme temperatures of 2000° F. or more during full power operation of the turbine engine. Continuous operation at high temperatures may result in distress of the components as well as a decrease in their operational efficiency. In a non-recuperated engine, the components may be cooled by the compressor discharge air before it reaches the combustor. However, in a recuperated turbine engine, the compressor discharge air may be heated by passing through the recuperator before reaching the turbine module components and the combustor and therefore is not suitable for cooling the turbine components. Therefore, to effectively cool the turbine module components in a recuperated turbine engine, a separate cooling system and/or pathway may be designed. One option of the prior art has been to have an external pump or cooler added to the engine. This often involves adding dedicated and sometimes convoluted, air passages as well as additional weight to the engine. In contrast to the prior art, the secondary flow turbine cooling air system of the present invention may effectively cool the turbine module components with only minor changes to the design of the turbine engine and without the addition of external components or numerous air passages. The system of the present invention may also result in minimal temperature increases and minimal pressure loses in the compressor discharge air as it flows from the compressor, through the recuperator and to the turbine module components.

Illustrated in FIG. 1 is a portion of a recuperated gas turbine engine 10, that may include a compressor 12, a combustor 14, a combustor case 16, a recuperator 18, a recuperator and turbine support adapter 20 for securing recuperator 18, and a turbine bearing support housing 50 to combustor case 16. Recuperator and turbine support adapter 20 may comprise at least one strut 21 wherein the strut 21 may comprise an open passage 21a running the length of strut 21. The secondary cooling air-flow system of the present invention may comprise an outer flow path 24 which may be defined by combustor case 16 and an outer flow separator 23, open passage 21a of strut 21 in which the open passage 21a is in fluid communication with the outer flow path 24 and an inner flow separator 38 which is in fluid communication with the open passage 21a of strut 21. Fluid communication, as used herewith, defines the flow of air or gases through the secondary flow turbine cooling air system.

The flow of compressor discharge air through engine 10 and through the secondary flow turbine cooling air system is also illustrated in FIG. 1. Compressor discharge air 22 may flow from compressor 12 along outer flow path 24. The flow of compressor discharge air 22 diverges as it reaches recuperator and turbine support adapter 20. The bulk of compressor discharge air 22 may flow through recuperator and turbine support adapter 20 to a recuperator inlet 26. The compressor discharge air 22 may then be heated by turbine exhaust 30 as it passes through the recuperator 18 before being discharged. The now-heated recuperator discharge air 28 flows back through recuperator and turbine support adapter 20 to the combustor 14 to be used in the combustion process. A portion of compressor discharge air 22 may be diverted at recuperator and turbine support housing 20 to provide secondary flow cooling air 34. This secondary flow cooling air 34 may flow through open passage 21a of strut 21. As secondary flow cooling air 34 exits open passage 21a, it may be directed by an inner flow separator 38 toward turbine module components such as, but not limited to, a turbine shroud 42, a turbine nozzle 44, a turbine blade tip 46, a transion liner 40, or turbine bearing support housing 50.

As an example, compressor discharge air 22 may be at a temperature of about 500° F. to about 700° F. As the portion of secondary flow cooling air 34 moves through open passage 21a of strut 21, it may be heated by about 5° F. to about 100° F. This temperature increase is significantly less than that of the compressor discharge air 22 that moves through recuperator 18, which is heated to a temperature of from about 1100° F. to about 1300° F.

It is contemplated that the secondary flow turbine cooling air system of the present invention may be used with any recuperated gas turbine engine. While exemplary embodiments describe using the secondary flow turbine cooling air system with a recuperator and turbine support adapter having a plurality of struts, the secondary flow turbine cooling air system may be used with a recuperator and turbine support adapter having struts or similar structural attributes for the passage of secondary flow cooling air 34 to the turbine module components. A non-limiting example of a recuperated gas turbine engine would be a recuperated gas turbine engine adapted for providing power for a land vehicle, such as, but not limited to, an armored ground vehicle.

Figure 2:
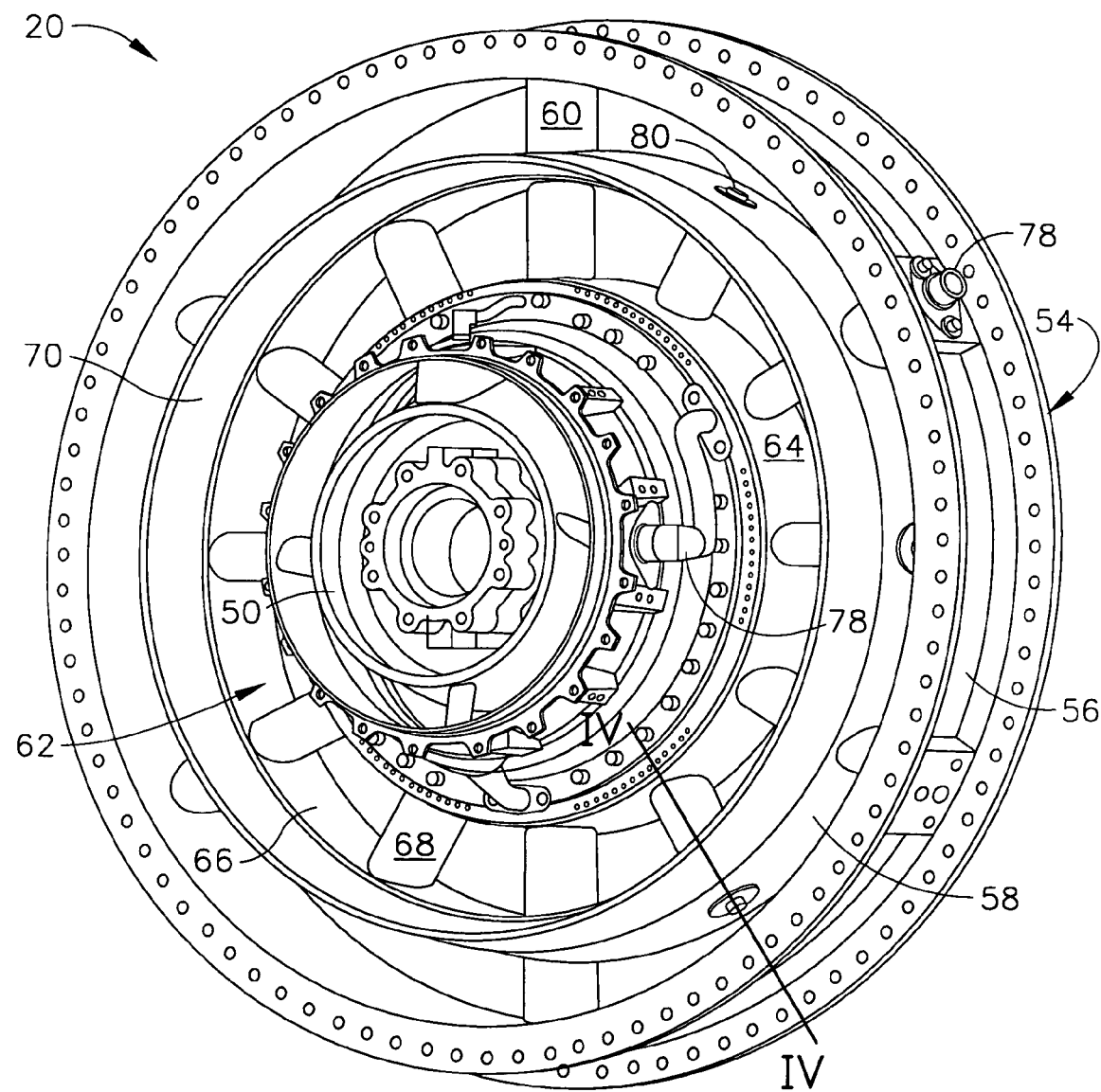
FIG. 2 is a perspective view of the front of a recuperator and turbine support adapter for attaching a recuperator and a turbine bearing support housing assembly to a combustor case, according to the invention.
Figure 3:
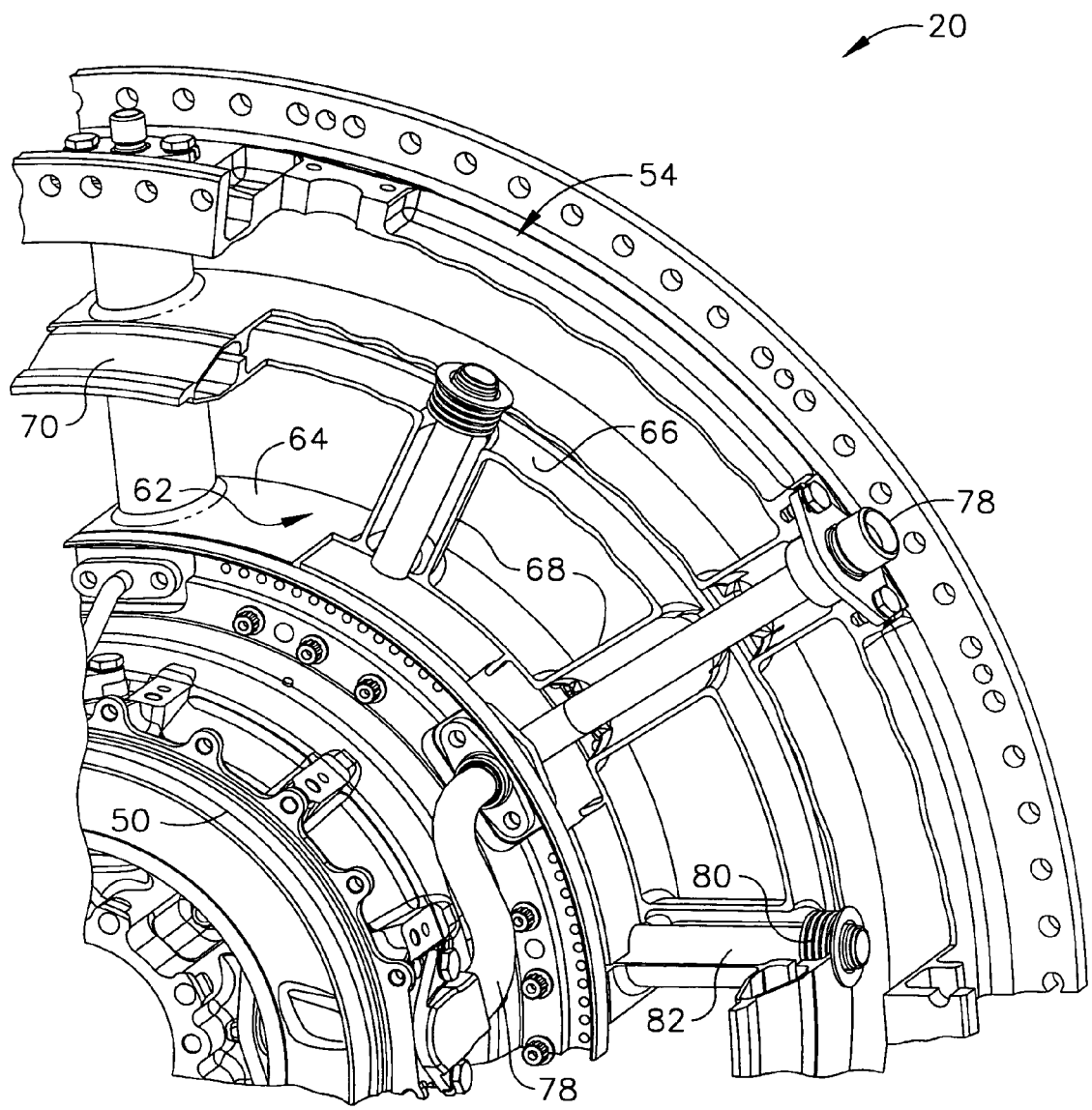
FIG. 3 shows a cutaway portion of the recuperator and turbine support adapter of FIG. 2, according to the present invention.

Referring to FIGS. 2 and 3, an exemplary recuperator and turbine support adapter 20 for use in a secondary flow turbine cooling air system of the present invention is shown, which, along with alternative embodiments, is disclosed more fully in patent application U.S. Ser. No. 10/940,527, hereby incorporated by reference. FIG. 2 shows the front of recuperator and turbine support adapter 20 with turbine bearing support housing 50 attached, while FIG. 3 shows a cutaway portion of recuperator and turbine support adapter 20. Recuperator and turbine support adapter 20 may comprise annular outer strutted body 54 and annular inner strutted body 62. Thermal spring 70 may connect inner strutted body 62 to outer strutted body 54. In one embodiment, outer strutted body 54 may comprise first outer ring 56, first inner ring 58 and a plurality of outer struts 60 connecting the first outer ring 56 and first inner ring 58 to each other. Outer struts 60 may be symmetrically or randomly arranged around annular outer strutted body 54. In an illustrative embodiment, annular outer strutted body 54 may comprise at least three outer struts 60. In a second illustrative embodiment, annular outer strutted body 54 may comprise six outer struts 60, depending on the structural requirements and the amount of service lines required.

The open area between outer struts 60 may provide outer flow path 24 for compressor discharge air 22 flowing into recuperator 18 (see, e.g., FIG. 1). Outer struts 60 positioned around outer strutted body 54 may be arranged in any pattern and/or be of any shape or size to provide optimal air flow and/or satisfy the desired service line requirements. In the exemplary recuperator and turbine support adapter 20 shown in FIG. 2, outer struts 60 are symmetrically arranged around outer strutted body 54. Additionally, one or more of outer struts 60 may comprise an open passage for running buffer air supply line 78 through outer strut 60. The cross-sectional width of outer struts 60 may be determined based on the function of the outer strut 60. Outer struts 60 may all have the same cross-sectional width or they may have two or more different cross-sectional widths. For example, if outer strut 60 is to comprise buffer air supply line 78, the cross-section of outer strut 60 may depend on the size of buffer air supply line 78 passing through outer strut 60.

In another embodiment, annular inner strutted body 62 may comprise second outer ring 66, second inner ring 64, and a plurality of inner struts 68 connecting second outer and second inner rings 66, 64 to each other. Inner struts 68 may be symmetrically or randomly arranged around annular inner strutted body 62. In an illustrative embodiment, annular inner strutted body 62 may comprise at least three inner struts 68. In a second illustrative embodiment, annular inner strutted body 62 may comprise six or twelve inner struts 68, depending on the structural and service line requirements. The open area between inner struts 68 may provide a flow path for hot recuperator discharge air 28 (see, e.g., FIG. 1) from recuperator 18. Although not required, symmetrical arrangement of inner struts 68 around inner strutted body 62 may provide a more optimal flow of hot recuperator discharge air 28. Additionally, as illustrated in FIG. 3, one or more of inner struts 68 may comprise an inner open passage 69 for running air buffer line 78 through inner strut 68. Alternatively, inner struts 68 may have inner open passage 69 (see FIGS. 4A and 5A) for providing secondary flow cooling air 34 to the turbine cavity. Secondary flow cooling air 34 provided to the turbine cavity may be used to cool turbine module components, such as, but not limited to, turbine shroud 42, turbine blades 46, turbine nozzle 44, transion liner 40, or turbine bearing support housing 50. The minimum number of inner struts 68 in annular inner strutted body 62 may be determined by the number of air buffer lines 78 required to run in and out of recuperator and turbine support adapter 20, and the number of inner struts 68 required to provide cooling air. Likewise, the cross-sectional width of inner struts 68 may be determined based on the function of inner strut 68. Inner struts 68 may all have the same cross-sectional width or they may have two or more different cross-sectional widths. Although not necessary, the number and dimensions of inner struts 68 may be such to provide for uniform cooling of turbine module components.

Figure 4A:
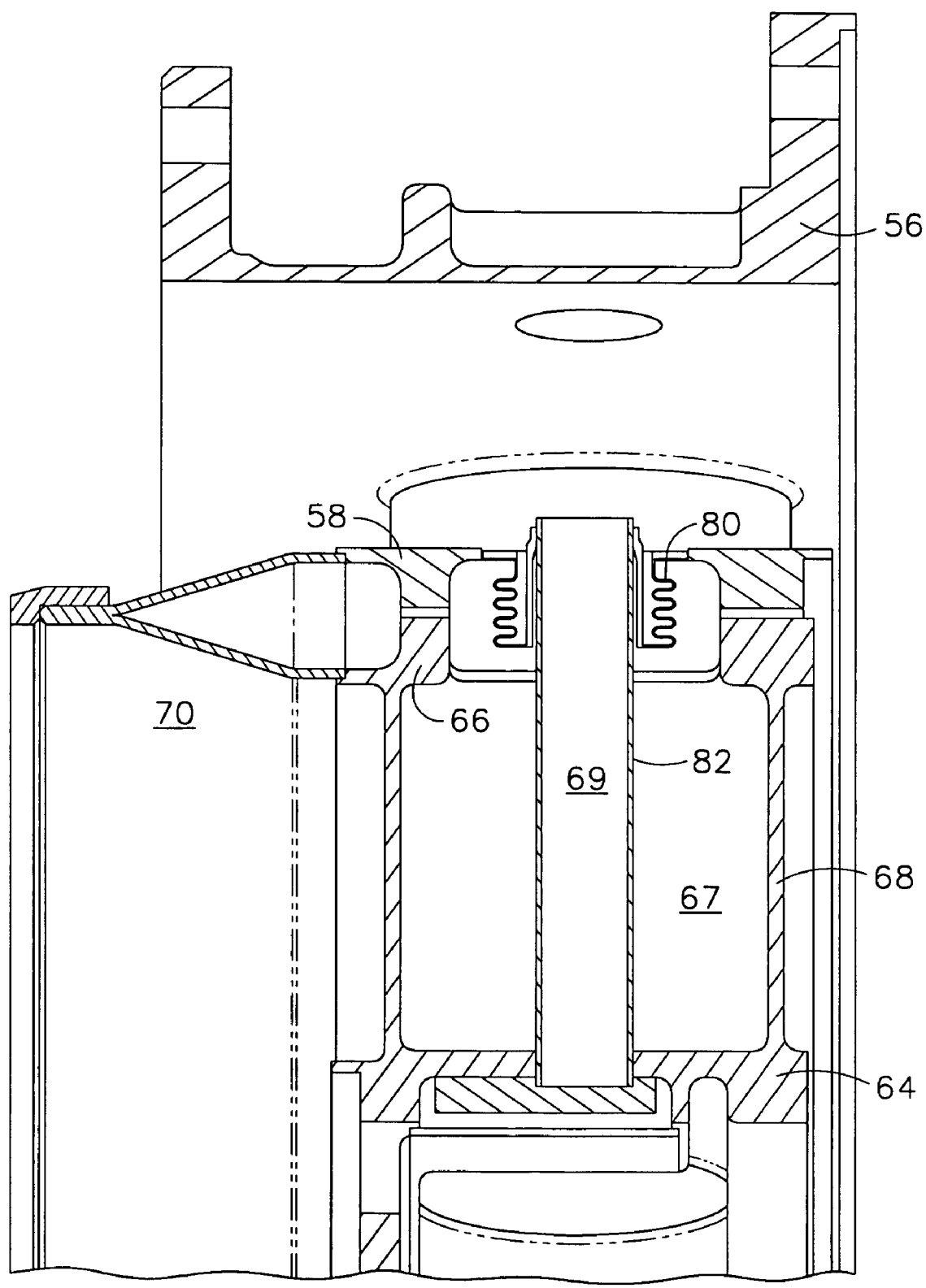
FIG. 4A shows a cross-sectional view of an inner strut having a tube and compliant duct along the section-line IV-IV of the adapter of FIG. 2, according to one embodiment of the invention.
Figure 4B:
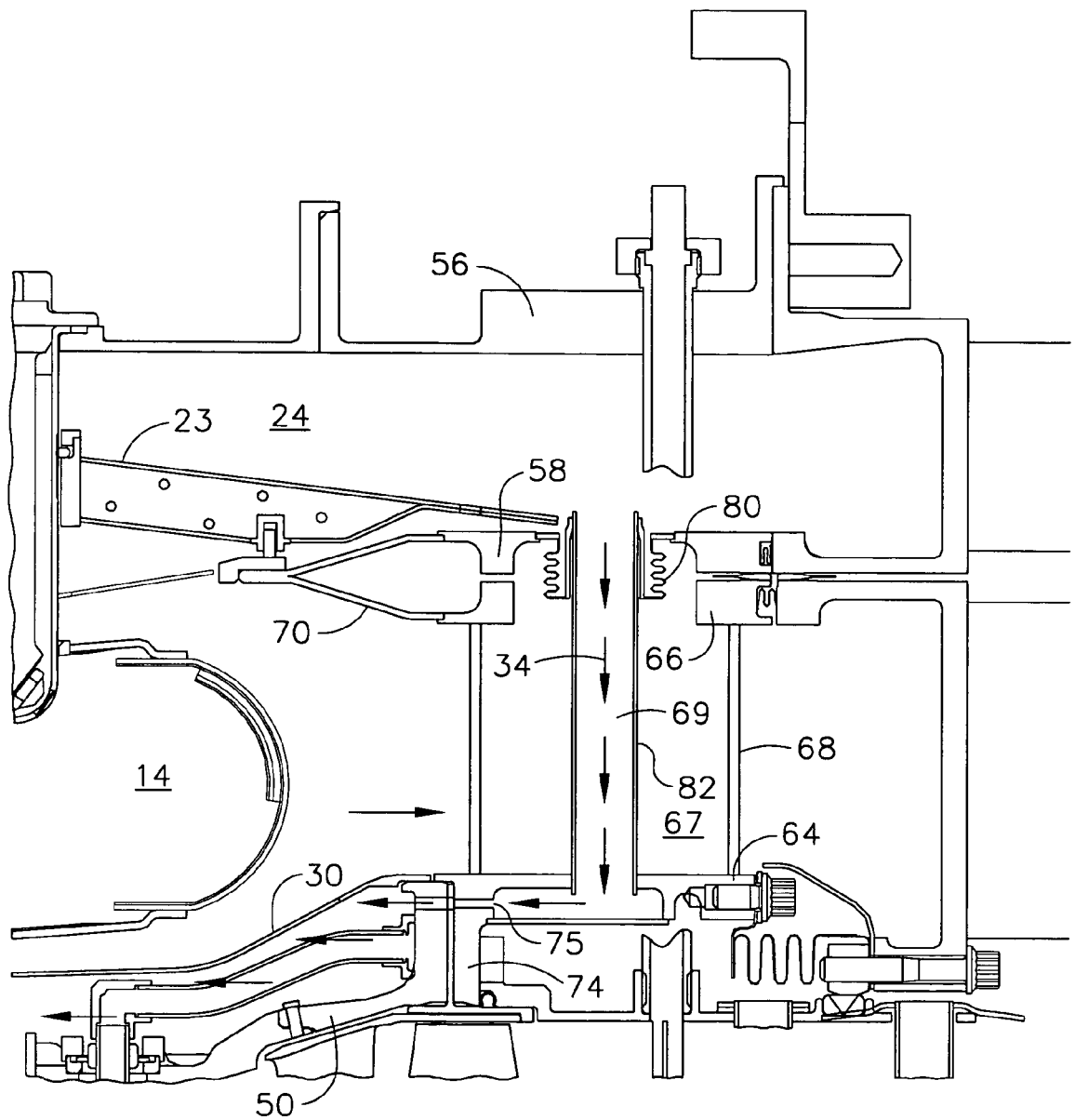
FIG. 4B shows an axial cross-sectional view of a portion of a recuperated gas turbine engine showing the cross-section of a strut of an inner strutted body, according to the embodiment of FIG. 4A.

In one embodiment, inner open passage 69 may comprise a tube 82 and a compliant duct 80, for example, but not limited to, a bellows, as illustrated in FIGS. 4A and 4B. Tube 82 may span the entire length of inner strut 68 with compliant duct 80 at the top of the inner open passage 69. The ends of the inner strut 68 may be sealed such that secondary flow cooling air 34 is forced to flow through tube 82 and compliant duct 80. The diameter of tube 82 may be such that secondary flow cooling air 34 maintains pressure while flowing through tube 82. For example, the pressure of secondary flow cooling air 34 when it exits inner open passage 69 may have about 90% to about 100% of the original pressure of compressor discharge air 22. In an alternative example, there may be a minimum flow area of about 1.0 square inch of secondary flow cooling air 34. Alternatively, the clearance around high pressure turbine shroud 42 may be increased, and the minimum flow area may then be 2.0 square inches. If tube 82 is too narrow, the pressure may drop when secondary flow cooling air 34 exits tube 82. By way of non-limiting example, tube 82 may be from about 0.45 inches to about 0.55 inches in diameter to satisfy the required uniform flow and pressure requirements of the turbine module components.

Figure 5A:
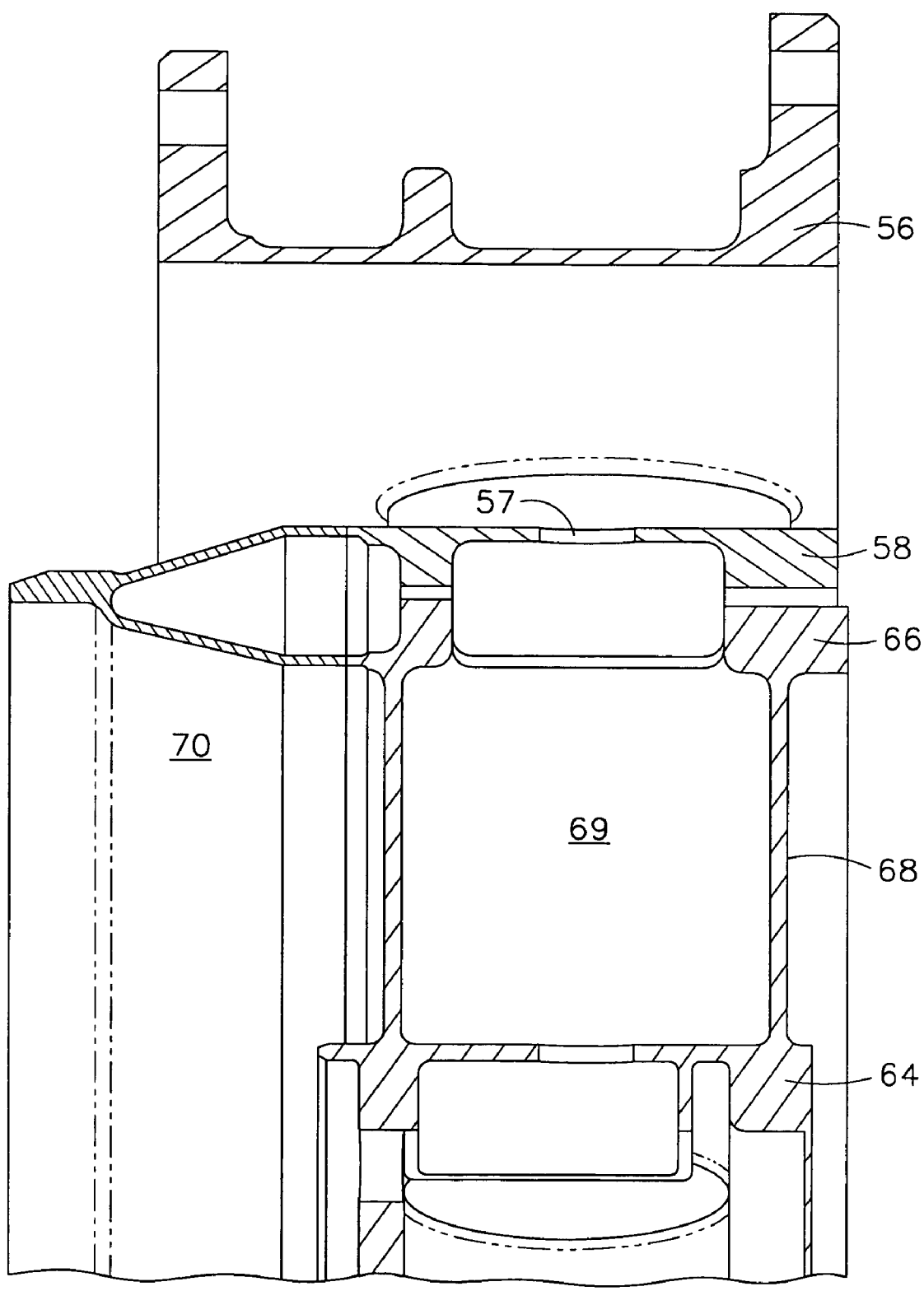
FIG. 5A shows a cross-sectional view of a pressurized inner strut of the recuperator and turbine support adapter of FIG. 2, according to another embodiment of the invention.
Figure 5B:
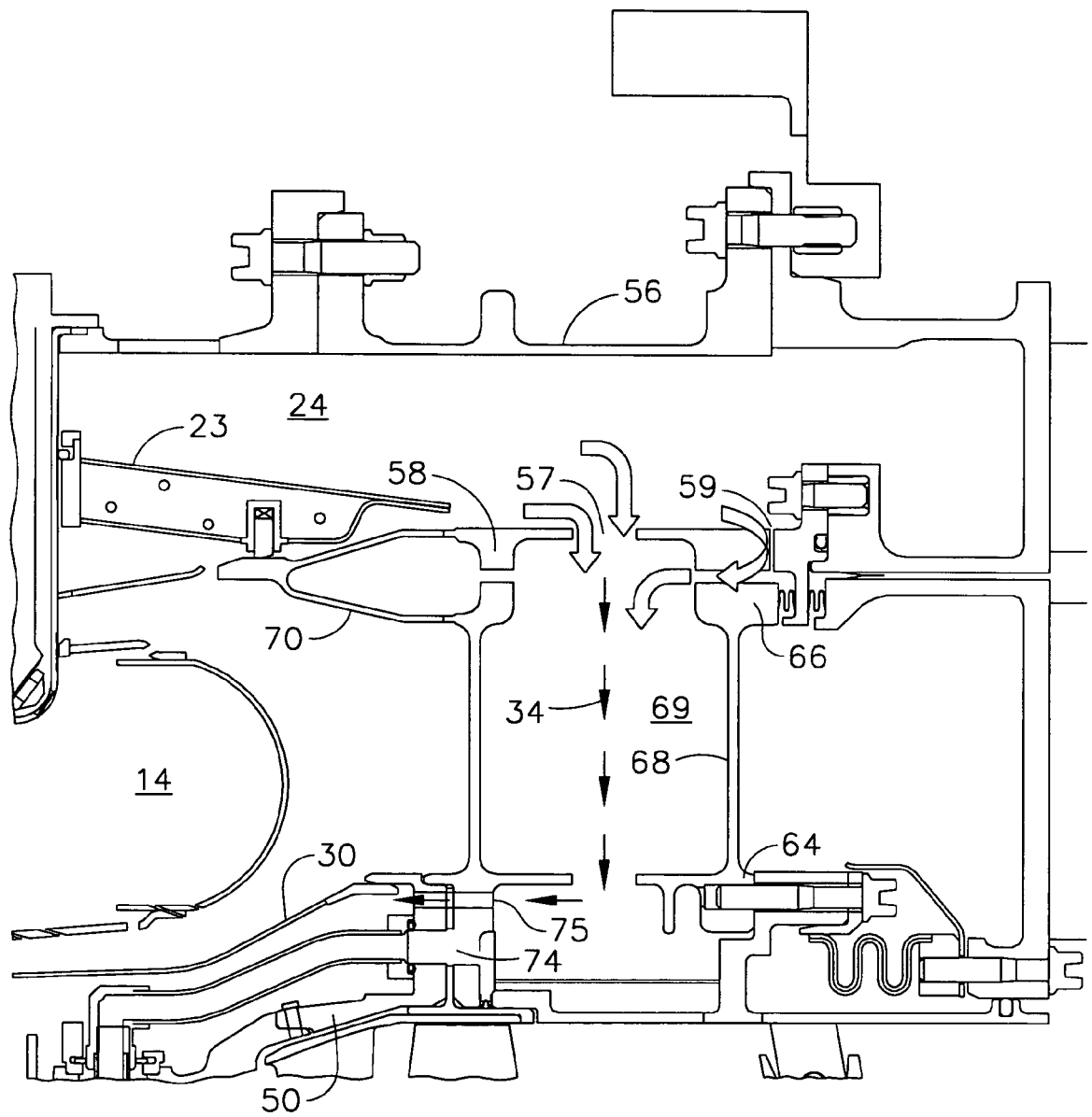
FIG. 5B shows an axial cross-sectional view of a recuperated gas turbine engine showing the cross-section of a strut of an inner strutted body, according to the embodiment of FIG. 5A.

In an alternative embodiment, inner open passage 69 may be pressurized via the inherent pressure of compressor discharge air 22 without the addition of a tube 82 and compliant duct 80. As illustrated in FIGS. 5A and 5B, inner open passage 69 may comprise the whole interior of inner strut 68. Additionally, at least one outer open passage 57 and at least one open slot 59 may be positioned in first inner ring 58 of outer strutted body 54 for the passage of secondary flow cooling air 34 from outer flow path 24 to open passage 69 of inner strut 68. Outer open passages 57 may be positioned between outer struts 60. There may be a sufficient number of outer open passages 57 and/or open slots 59 to provide optimal cooling of the turbine module components. By way of non-limiting example, the number of outer open passages 57 may be the same as the number of outer struts 60. Open slot 59 may be positioned at an aft end of first inner ring 58 of outer strutted body 54. Open slot 59 may run circumferentially around first inner ring 58 at the aft end. Alternatively, there may be discrete open slots 58 spaced circumferentially around the aft end of first inner ring 58. Flow and pressure of secondary flow cooling air 34 within inner open passage 69 may be maintained by the pressure of compressor discharge air 22 as it moves through outer flow path 24. By way of illustrative example, if the pressure of compressor discharge air 22 is 82.6 psig, the pressure of secondary flow cooling air 34 may be 81.7 psig. Alternatively, when the compressor discharge air 22 has a pressure of 97.7 psig, secondary flow cooling air 34 may have a pressure of 96.7 psig. There may be minimal drop in the pressure of secondary flow cooling air 34 compared to compressor discharge air 22.

Inner open passage 69 may further comprise insulation (not shown) to prevent a large increase in the temperature of secondary flow cooling air 34. Inner struts 68 may be exposed to recuperator discharge air 28 where recuperator discharge air 28 may have been heated to a temperature of from about 1100° F. to about 1300° F. Therefore, the temperature of secondary flow cooling air 34 may increase as it moves through inner open passage 69 of heated inner strut 68. The presence of insulation may keep the increase of temperature of secondary flow cooling air 34 to a minimum. In one embodiment, the temperature of secondary flow cooling air 34 may increase by about 5° F. to about 100° F. FIG. 4A shows inner open passage 69 that may comprise tube 82, compliant duct 80 and a space 67 between the tube 82 and the sides of the strut 68 wherein space 67 may comprise insulation material. For example, the space between the tube 82 and the insides of the strut 68 may contain air which may be a good insulator against increasing temperature. For example, as secondary flow cooling air 34 flows through inner open passage 69, the temperature of secondary flow cooling air 34 may increase by only about 10° F. In contrast, when secondary flow cooling air 34 passes through inside of inner strut 68 of FIG. 5A having a pressurized inner open passage 69 with no insulation, the temperature may increase by about 50° F. to about 75° F. Insulation material for insulating inner strut 68 may be, but not limited to, air, magnesium oxide, high temperature ceramic batting, a metallic heat shield welded to inner strut 68, or a spray-on ceramic-based insulation. The presence of insulation material, while not necessary, may increase the efficiency of the cooling of turbine module components by limiting the temperature increase of secondary flow cooling air 34.

Figure 6:
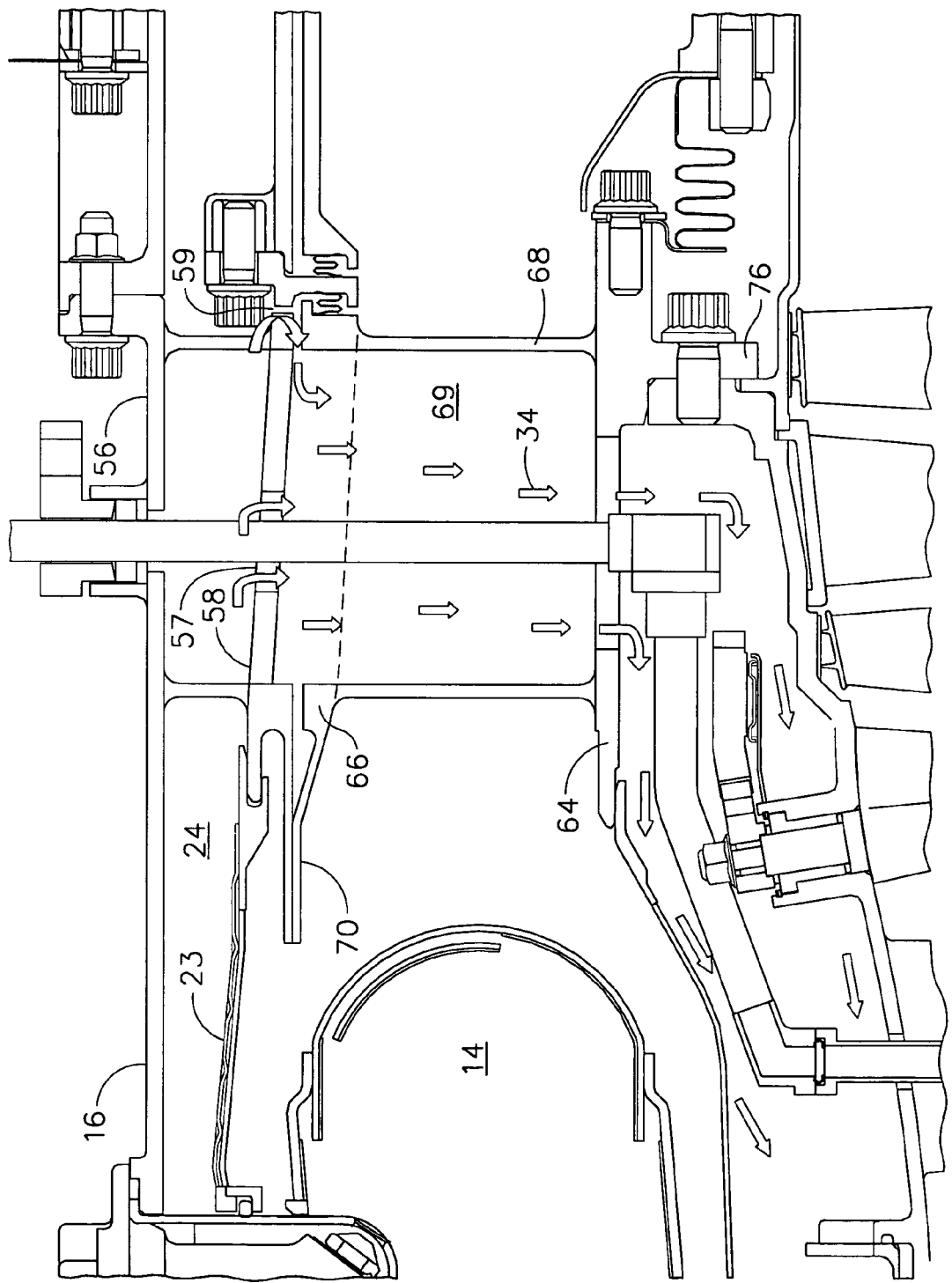
FIG. 6 shows an axial cross-sectional view of a recuperated gas turbine engine showing a cross-section of a strut of an inner strutted body, according to yet another embodiment of the invention.

Inner strutted body 62 may further comprise a forward flange 74 for securing recuperator and turbine support adapter 20 to turbine bearing support housing 50, as illustrated in FIGS. 4B and 5B. By positioning forward flange 74 forward of inner strut 68, secondary flow cooling air 34 may flow through capillary holes 75 in forward flange 74. Alternatively, inner strutted body 62 may further comprise aft flange 76 for securing recuperator and turbine support adapter 20 to turbine bearing support housing 50. As illustrated in FIG. 6, moving aft flange 76 to aft of inner strut 68 may allow for free flow of secondary flow cooling air 34 forward of aft flange 76. As efficient cooling of turbine module components may be dependent not only on pressure and temperature of secondary flow cooling air 34, but also on the amount and rate of secondary flow cooling air 34 flowing to the turbine module components, it may be desirable to allow the free flow of secondary flow cooling air 34. For example, about 5% of the compressor discharge air 22 from compressor 12 may be diverted as secondary flow cooling air 34. With the secondary flow cooling air 34 flow being at about 5% of the compressor discharge air 22, the secondary flow cooling air 34 arriving at the turbine module components is comparable to that of a non-recuperated turbine engine where compressor discharge 22 air flows from compressor 12 directly to the turbine module components.

As secondary flow cooling air 34 exits inner open passage 69 it may flow along inner flow separator 38 to the turbine module components which may be in fluid communication with inner flow separator 38 as illustrated in FIG. 1. Inner flow separator 38, besides directing the flow of secondary flow cooling air 34, may provide insulation from combustor 14, where the temperature may be from about 1000° F. to about 1500° F. Inner flow separator 38 may extend from the bottom of inner strut 68 and along combustor 14. Inner flow separator 38 may be sealed to the outside of combustor 14 by riveting or welding, for example.

Figure 7:
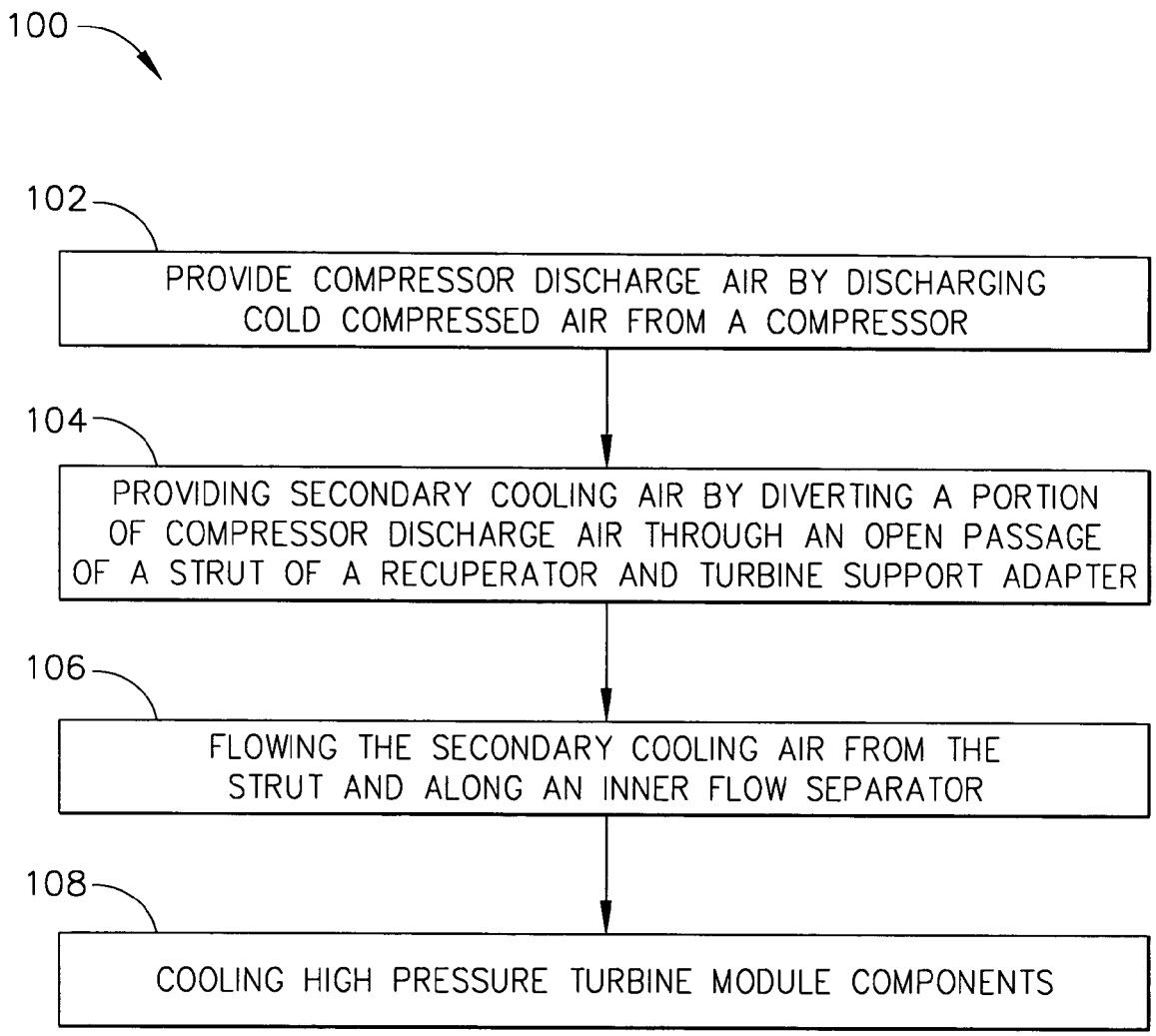
FIG. 7 is a flow chart showing a method of cooling high pressure turbine module components, according to the invention.

With reference to FIG. 7, in another embodiment of the present invention, a method 100 for cooling high pressure turbine module components of a recuperated gas turbine engine is provided. The method 100 may comprise step 102 of providing compressor discharge air by discharging cold compressed air from a compressor, wherein the compressor discharge air may flow through an outer flow path to a recuperator and turbine support adapter. The recuperator and turbine support adapter may comprise a plurality of struts, wherein at least one strut may comprise an open passage. The compressor discharge air may be at a temperature of about 500° F. to about 700° F. The method 100 may further comprise step 104 of providing a secondary flow cooling air by diverting a portion of the compressor discharge air through the open passage of the struts of the recuperator and turbine support housing. The portion of compressor discharge air diverted may be from about 4% to about 6%. Method 100 may further comprise step 106 of flowing the secondary flow cooling air from the strut and along an inner flow separator, and step 108 of cooling the high pressure turbine module components with the secondary flow cooling air.

It should be understood, of course, that the foregoing relates to exemplary embodiments of the invention and that modifications may be made without departing from the spirit and scope of the invention as set forth in the following claims.

We claim:

1. A method for cooling high pressure turbine module components of a recuperated turbine engine comprising the steps of:
    providing compressor discharge air by discharging cold compressed air from a compressor;
    providing secondary flow cooling air by diverting a portion of the compressor discharge air through an open passage of a strut of a recuperator and turbine support adapter;
    flowing the secondary flow cooling air from the strut and along an inner flow separator; and
    cooling the high pressure turbine module components with the secondary flow cooling air.

2. The method of claim 1 wherein the recuperator and turbine support adapter comprises: an annular outer strutted body, the outer strutted body comprising a first outer ring and first inner ring, the first outer ring connected to the first inner ring by a plurality of outer struts, and at least one outer open passage through the first inner ring, the outer open passage being positioned between two of the outer struts; an annular inner strutted body, the inner strutted body comprising a second outer ring and a second inner ring, the second outer ring connected to the second inner ring by a plurality of inner struts, wherein at least one of the inner struts comprises the open passage wherein the open passage is an inner open passage, the inner open passage being aligned with the outer open passage; and a thermal spring connecting the first inner ring of the outer strutted body to the second outer ring of the inner strutted body; wherein the compressor discharge air flows through the outer open passage to the inner open passage of the inner strut and then to the inner flow separator.

3. The method of claim 2 wherein the second inner ring of the inner strutted body of the recuperator and turbine support adapter further comprises an aft flange, wherein the secondary flow cooling air flows forward of the aft flange to the inner flow separator.

4. The method of claim 1 wherein the turbine module components comprise a high pressure turbine shroud, a high pressure turbine nozzle, a high pressure turbine blade tip, a transition liner, or a turbine bearing support housing.

5. The method of claim 1 wherein the cooling of high pressure turbine module components is uniform.

6. A method for uniform cooling of high pressure turbine module components of a recuperated turbine engine comprising the steps of:
    providing compressor discharge air by discharging cold compressed air from a compressor, wherein the compressor discharge air flows through an outer flow path to a recuperator and turbine support adapter, the recuperator and turbine support adaptor comprising an annular outer strutted body, the outer strutted body comprising a first outer ring and first inner ring, the first outer ring connected to the first inner ring by a plurality of outer struts, and further comprising at least one outer open passage through the first inner ring, the outer open passage being positioned between two of the outer struts and an open slot at an aft end of the first inner ring of the outer strutted body, an annular inner strutted body, the inner strutted body comprising a second outer ring and a second inner ring, the second outer ring connected to the second inner ring by a plurality of inner struts, at least one of the inner struts further comprising an inner open passage wherein the inner open passage is aligned with the outer open passage, and a thermal spring connecting the first inner ring of the outer strutted body to the second outer ring of the inner strutted body;

providing a secondary flow cooling air by diverting a portion of the cold compressed air through the outer open passage and the open slot to the inner open passage of the inner strut of the recuperator and turbine support adapter;

flowing the secondary flow cooling air from the inner open passage of the inner struts along an inner flow separator; and cooling the high pressure turbine module components with the secondary flow cooling air.

7. The method of claim 6 wherein the compressor discharge air has a temperature of from about 500.degree. F. to about 700.degree. F. before it is diverted to the inner open passage of the inner strut.

8. The method of claim 6 wherein the secondary flow cooling air, after flowing from the open passage, has from about 90% to about 100% of the pressure of the compressor discharge air.

9. The method of claim 6 wherein the temperature of the secondary flow cooling air increases by only about 5.degree. F. to about 100.degree. F. after moving through the inner open passage of the inner struts.

10. The method of claim 6 wherein the temperature of the secondary flow cooling air increases by only about 50.degree. F. to about 75.degree. F. after moving through the inner open passage of the inner struts.

11. The method of claim 6 wherein the secondary flow cooling air has a minimum flow area of about 1 square inch when cooling the turbine module components.

12. The method of claim 6 wherein the secondary flow cooling air has a minimum flow area of about 2 square inches when cooling the turbine module components.

13. The method of claim 6 wherein the portion of compressor discharge air diverted is about 5%.

14. The method of claim 6 wherein the secondary flow cooling air, after flowing from the radial gap between the outer strutted body and the inner strutted body and the open passages of the struts, has from about 90% to about 100% of the pressure of the compressor discharge air.

* * * * *